Patented May 18, 1926.

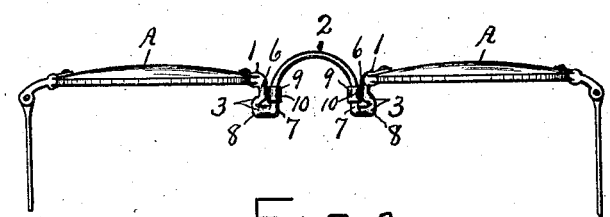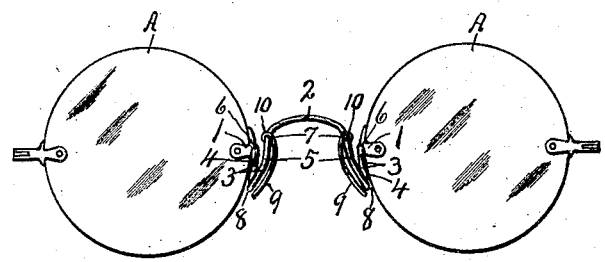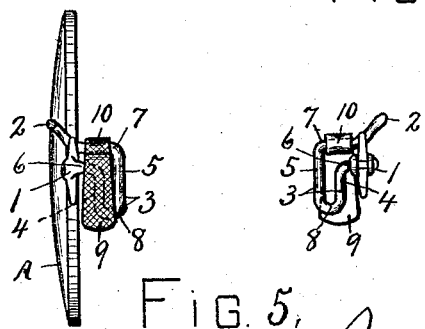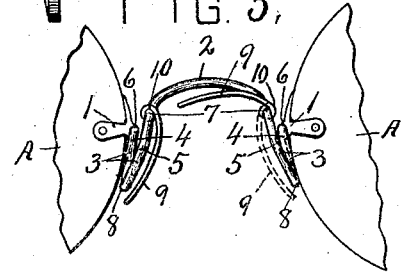

1,584,714

UNITED STATES PATENT OFFICE.

GEORGE BAUSCH, OF SYRACUSE, NEW YORK.

LENS MOUNTING FOR EYEGLASSES.

Application filed December 5, 1922. Serial No. 605,027.

This invention relates to a lens mounting for eye glasses, spectacles and the like in which the bow connecting the lens supporting posts is provided with opposite rearwardly, downwardly and upwardly extending arms preferably integral therewith to form opposite loops at the rear of the posts so that either arm of each loop may be bent laterally or forwardly, and rearwardly by means of a pair of pliers or other suitable tool for the purpose of adjusting and setting the lenses the proper pupillary distance apart and also for adjusting the lenses and bridge piece of the bow forwardly and rearwardly relatively to each other as may be required to fit the eyes of the user.

This of course, implies that the loops will extend downwardly in more or less diverging planes at opposite sides of the bridge of the nose which necessitates the use of suitable nose guards to prevent irritation of the nose by the loops, and the main object of my invention is to support these nose guards upon the rearwardly extending offsets at the ends of the bow in such manner that they may be moved out of the way of the loops without displacement to permit the manipulation of a tool in bending or adjusting the offset arms of the loops to properly fit the lenses to the eyes.

Other objects and use relating to specific parts of the mounting will be brought out in the following description.

In the drawings:

Figures 1 and 2 are respectively, a top plan and a side elevation of a pair of lenses, and my improved mounting for connecting the same.

Figure 3 is an enlarged transverse vertical sectional view through the central portion of the mounting showing one of the nose guards in its normal position.

Figure 4 is an enlarged edge view of the detached mounting.

Figure 5 is an enlarged rear elevation of the mounting showing portions of the lenses broken away and also showing one of the nose guards as swung upwardly away from the adjacent loop to permit the use of a suitable tool for bending or adjusting the arms of the loop as may be required to properly fit the lenses to the eyes of the user without displacing the nose guards from the mounting.

As illustrated, this mounting comprises a pair of lens supporting posts —1— and a bow or bridge piece —2— having its opposite ends offset rearwardly to form pivotal pintles —7— for the nose guards, the rear ends of said pintles being bent downwardly, forwardly and upwardly to form U-shaped loops —3— below their respective pintles, the upper ends of the front arms as —4— of the loops being offset forwardly at —6— and attached to the posts —1— so that the pintles —7— and loops are disposed at the rear of the plane of the lenses which permits the nose guards to be swung to normal positions along the inner sides of the loops to positions above the loops which in turn permits the use of pinchers or other suitable tools upon different portions of the loops for adjusting the lenses without interference by the nose guards.

The lower ends as —8— of the loops constitute returned bends which permit the arms —5— to be adjusted by bending forwardly and rearwardly and also laterally toward and from each other to establish the desired relation between the bow —2— and lenses as A and also to properly adjust the distance between the centers of the lenses to conform to the pupillary distance of the user.

The specific forms of these loops, therefore, greatly simplify and facilitate the various adjustments necessary to fit the lenses to the eyes of the users without disturbing the shape of the bow or overstraining the connections between the lens posts and adjacent portions of the mounting and while they might be used as nose guards for engaging opposite sides of the bridge of the nose to hold the mounting against lateral displacement, it is obvious that they would be rather uncomfortable, and in order to maintain the utility of this particular form of loops, and at the same time to protect the nose against undue irritation, I have provided a pair of nose guards —9— of relatively thin and highly resilient metal having their upper ends provided with eyes —10—.

The nose guards —9— are journaled at their upper ends upon the offset portions or pintles —7— of the mounting to extend downwardly therefrom practically the entire length of the loops —3— and are preferably bowed longitudinally toward each other for frictional engagement with opposite sides of the bridge of the nose of the user.

Aside from the pivotal connection of the eyes —10— with the offset portions —7— the nose guards —9— are unattached to the loops and are free to swing inwardly and upwardly to the position shown by full lines at the right of Figure 5 out of the way of the loops to permit the arms of the loops to be bent forwardly or rearwardly or laterally as may be desired to fit the mounting to the nose and to properly position the lenses relatively to the eyes of the user, after which the nose guards —9— may be swung downwardly to their normal positions with the lower ends resting against the inner faces of the corresponding ends of the loops.

By constructing the loops —3— and their connections with the posts —1— and bow —2— and assembling the nose guards upon the offset portion —7— of the loops in the manner described, enables the nose guards to be used to protect the nose against irritation without in any way interfering with the free bending of the arms —4— and —5— to properly adjust the mounting and lenses to the nose and eyes.

It is also evident that by making the bridge, as a whole connecting the posts —1—, of a single piece of wire or equivalent bendable metal enables the bridge to be easily adjusted by bending at any of the bends all of which greatly facilitates and expedites the work of adjusting the mounting and lenses to fit the user and at the same time retains the nose guards in position upon the mounting ready for use by simply swinging them down to their normal position.

I claim:

In a lens mounting for eye glasses, a bow having its ends offset rearwardly to form pintles, the rear ends of said pintles being bent downwardly, forwardly and upwardly to form loops having the upper ends of their rear arms offset forwardly, nose guards journaled at their upper ends on said pintles to swing from normal positions along the inner sides of the loops to positions above said loops to permit access to the parts of the loops for bending adjustment without interference by the nose guards, and lens-supporting posts secured to the upper offset ends of the front arms of the loops.

In witness whereof I have hereunto set my hand this 28th day of November, 1922.

GEORGE BAUSCH.